(12) United States Patent
Espinoza

(10) Patent No.: US 7,114,698 B2
(45) Date of Patent: Oct. 3, 2006

(54) QUARTER TURN VALVE LOCKING DEVICE

(76) Inventor: Roger Espinoza, 32 E. Country Club Dr., Brentwood, CA (US) 94513

( * ) Notice: Subject to any disclaimer, the term of this patent is extended or adjusted under 35 U.S.C. 154(b) by 27 days.

(21) Appl. No.: 10/966,379

(22) Filed: Oct. 15, 2004

(65) Prior Publication Data
US 2005/0092367 A1    May 5, 2005

Related U.S. Application Data

(60) Provisional application No. 60/512,319, filed on Oct. 17, 2003.

(51) Int. Cl.
*F16K 35/00* (2006.01)
(52) U.S. Cl. .................. 251/93; 251/90; 137/385
(58) Field of Classification Search .................. 251/93, 251/91, 92; 70/177; 137/385
See application file for complete search history.

(56) References Cited

U.S. PATENT DOCUMENTS

| 1,322,721 | A | * | 11/1919 | Noonan ........................ 137/385 |
| 1,615,181 | A | * | 1/1927 | Swacker ....................... 70/180 |
| 1,924,831 | A | | 8/1933 | Bockman |
| 2,161,626 | A | | 6/1939 | Loughner et al. |
| 2,324,633 | A | | 7/1943 | McCarthy et al. |
| 2,390,972 | A | | 12/1945 | Weinberg |
| 3,111,137 | A | | 11/1963 | Carlin |
| 4,031,726 | A | | 6/1977 | De Jager |
| 4,199,127 | A | | 4/1980 | Osborn |
| 4,397,332 | A | | 8/1983 | Sample |
| 4,465,092 | A | * | 8/1984 | Vitale .......................... 137/328 |
| 4,926,900 | A | * | 5/1990 | Pietras ......................... 137/385 |
| 5,115,834 | A | * | 5/1992 | Champagne ................. 137/385 |
| 5,353,833 | A | * | 10/1994 | Martinez ..................... 137/385 |
| 5,598,840 | A | * | 2/1997 | Iund et al. ............. 128/207.14 |
| 6,209,365 | B1 | * | 4/2001 | Neeley ......................... 70/175 |

FOREIGN PATENT DOCUMENTS

DE          912517          7/1949

* cited by examiner

Primary Examiner—Justine R. Yu
Assistant Examiner—Andrew J. Rost
(74) Attorney, Agent, or Firm—Wood, Herron & Evans, LLP

(57) ABSTRACT

A locking device for quarter turn valves avoids the inadvertent, unauthorized or careless manipulation of quarter turn valves from a desired position thereby minimizing, if not eliminating, the likelihood for damage or injury in an industrial or other setting as a result of the unauthorized opening/closing of the valve. The locking device includes a shroud which is adapted to be placed over the upper end of the stem and adjacent portion of the handle on the valve. The shroud has a capping portion which securely engages a mounting pad of the valve and an upwardly extending channel designed to at least partially surround a portion of the handle. A hole is provided in the channel and aligns with a hole in an adjacent portion of the handle when the shroud is placed on the valve. As such, the post of a lock is easily inserted through the aligned holes. The locking device according to this invention advantageously prevents the unauthorized manipulation of the handle and the resulting rotation of the valve member to/from the open/closed positions.

20 Claims, 4 Drawing Sheets

QUARTER TURN VALVE LOCKING DEVICE

CROSS REFERENCE TO RELATED APPLICATIONS

This claims the benefit of U.S. Provisional Patent Application Ser. No. 60/512,319, filed Oct. 17, 2003, which application is hereby incorporated by reference in its entirety.

BACKGROUND OF THE INVENTION

This invention relates to locking systems in general, and specifically to a locking arrangement to secure valves against intentional and unintentional adjustment.

A wide variety of types of valves are currently used in a vast array of applications. One common type of valve is known as a quarter turn valve. Quarter turn valves are used in many industrial applications, particularly in the food and beverage, pulp and paper, pharmaceutical, specialty chemical, and fine chemical industries. Quarter turn valves offer numerous advantages, including the ability to be turned on/off more quickly than linear (or multi-turn) valves such as gate valves. Quarter turn valves are often used in industrial applications because they can be turned on and left open until the required amount of fluid has passed through the valve. Conversely, quarter turn valves are maintained in a closed position until actuated to allow the fluid to pass there through.

Quarter turn valves are one type of rotary motion valve in that they have a component that rotates to allow or shut off flow through the valve. The valve member within a quarter turn valve may be a butterfly, ball, plug or other operating member to alternately permit and inhibit flow of the fluid through the valve. Quarter turn valves may be a two-way valve in which the rotary valve member blocks or permits fluid flow through a single inlet port and single outlet port. Alternatively, a multi-port quarter turn valve allows for flow into or out of multiple inlet and/or outlet ports. The ports on quarter turn valves may be flanged, threaded or welded ports for connection to appropriate pipes conveying the fluid to and from the valve.

The rotary valve member within a quarter turn valve is typically connected by a stem projecting from the valve body. Manually actuated quarter turn valves typically have an elongate handle mounted to the stem. The handle is rotated through an arc of generally 90° for adjusting the valve member to and between the open and closed positions. However, other rotary motion valves within the broad category of quarter turn valves often include rotary valves that rotate more than or less than 90°. Therefore, as used herein, the term "quarter turn valve" is defined as any valve that includes a rotary valve member movable between open and closed positions.

As previously discussed, quarter turn valves are commonly used for general purpose and industrial applications. Their popularity is due in large part to lower maintenance requirements, economical operation, ease of installation and continued savings throughout their operational life as compared to other types of valves. Nevertheless, it is generally desirable to secure any valve and, in particular, quarter turn valves in a desired orientation (open/closed). Unfortunately, tampering with industrial operations is often a great temptation to certain people, or organizations, by unauthorized manipulation of the valves to interrupt or interfere with industrial productions. Alternatively, unauthorized manipulation of quarter turn valves may not be a premeditated act intended to cause damage but may simply be the result of inadvertent misuse or innocent mistakes. Nevertheless, occupational health and safety organizations, such as OSHA and other work place and industrial oversight organizations, advocate more control over the operation of quarter turn valves. The ability to securely lock quarter turn valves in a desired position avoids many, if not all, of the above-described problems. By so doing, potentially catastrophic and/or injurious conditions can be avoided if the adjustment of quarter turn valves in industrial and other settings is limited to authorized operators only.

However, known techniques for locking or disabling quarter turn valves have proven to be deficient. Standard pad locks having a U-shaped clevis or shackle cannot be conveniently and securely installed on quarter turn valves to inhibit unauthorized operation. Moreover, such locking mechanisms offer convenient access for someone to saw or otherwise dismantle the exposed shackle portion of the lock.

Alternatively, removal of the handle or manual actuator on such valves may temporarily inhibit someone from unauthorized operation of the valve but does not prevent manipulation of the valve with a similar user-provided handle or other tool. Moreover, handle removal by the authorized user for later valve manipulation is inconvenient, inefficient and troublesome.

Therefore, a need exists for a secure, effective and easily implemented device to prevent the unauthorized, inadvertent or otherwise undesired manipulation of quarter turn valves.

BRIEF SUMMARY OF THE INVENTION

These and other objectives of the invention have been obtained by an improved locking device and associated method of use for quarter turn valves according to this invention. The locking device for quarter turn valves according to this invention provides an economical and easily implemented solution for the secure locking of quarter turn valves. Moreover, such a device according to this invention cannot be easily defeated, destroyed or otherwise removed without authorization. Therefore, the inadvertent, unauthorized or careless manipulation of quarter turn valves from a desired position is prevented thereby minimizing, if not eliminating, the likelihood for damage or injury in an industrial or other setting as a result of the unauthorized opening/closing of the valve.

In one embodiment, the locking device includes a shroud which is adapted to be placed over the upper end of the stem and adjacent portion of the handle on the valve. The shroud may have a capping portion which securely engages a mounting pad of the valve. The shroud also includes an upwardly extending channel designed to at least partially surround a portion of the handle. In one embodiment, the channel portion of the shroud includes a hole sized, positioned and configured to align with a hole in an adjacent portion of the handle when the shroud is placed on the valve. As such, the post of a lock is easily inserted through the aligned holes. The post includes a knob or cap which fits snugly against the shroud to minimize and/or eliminate any exposure of the post thereby preventing unauthorized sawing or separation of the post and removal of the lock and shroud from the valve. Various configurations or embodiments of the shroud are envisioned within the scope of this invention, each of which are uniquely adapted for a particular quarter turn valve configuration.

The locking device according to this invention advantageously prevents the unauthorized manipulation of the handle and the resulting rotation of the valve member to/from the open/closed positions. Moreover, the locking device of this invention is easily and efficiently installed and removed by an authorized user, is economically produced and its use efficiently implemented thereby increasing the security and safety of installations utilizing quarter turn valves.

BRIEF DESCRIPTION OF THE SEVERAL VIEWS OF THE DRAWINGS

The objectives and features of the invention will become more readily apparent from the following detailed description taken in conjunction with the accompanying drawings in which.

DETAILED DESCRIPTION OF THE INVENTION

Figure 1A:
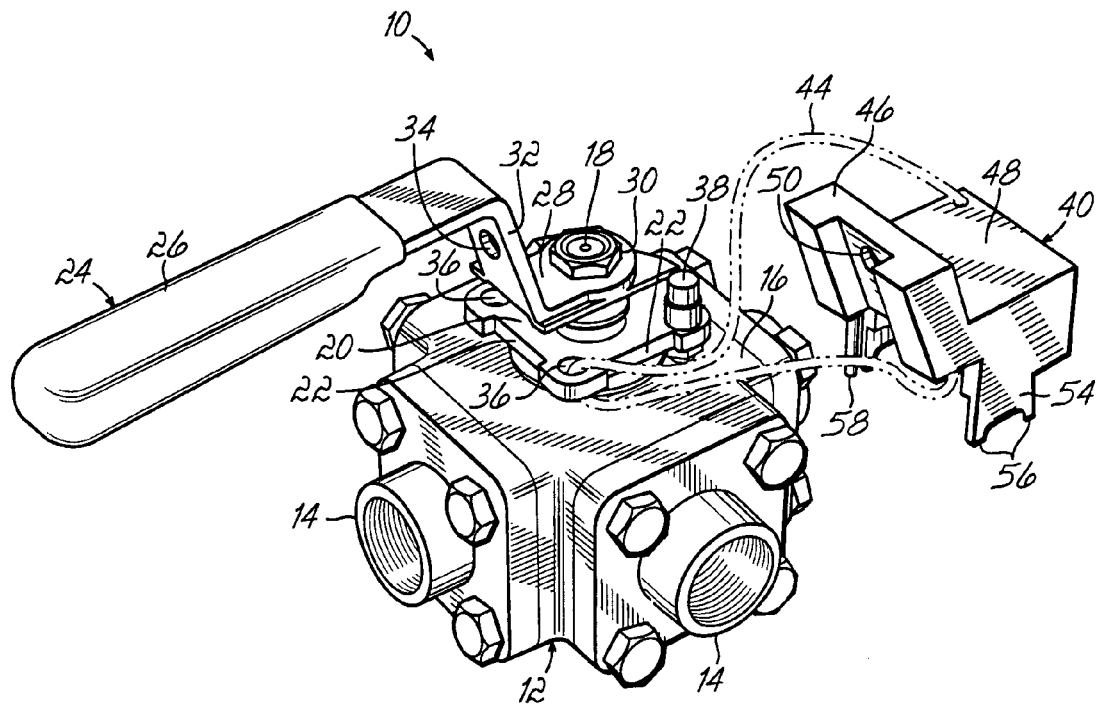
FIG. 1A is a perspective view of a locking device and valve according to one embodiment of this invention.
Figure 1B:
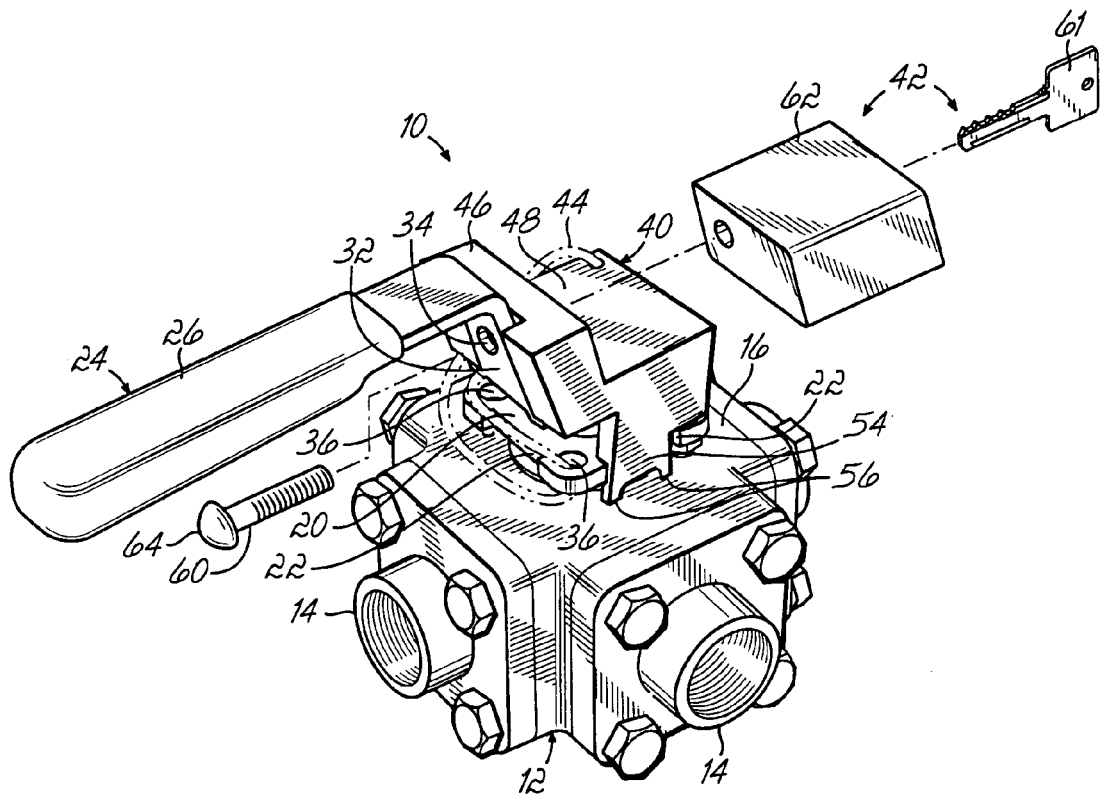
FIG. 1B is a view similar to FIG. 1A with the locking device being installed on the valve.
Figure 1C:
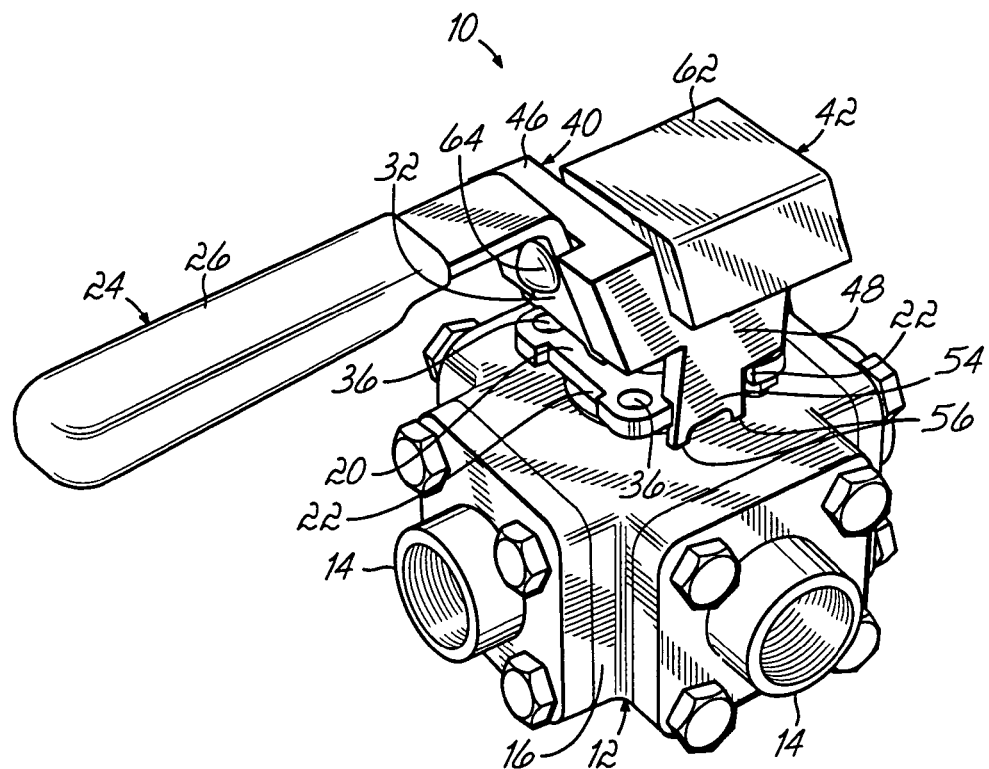
FIG. 1C is a view of the components of FIG. 1B installed on the valve in a locked position to inhibit adjustment of the valve.
Figure 2:
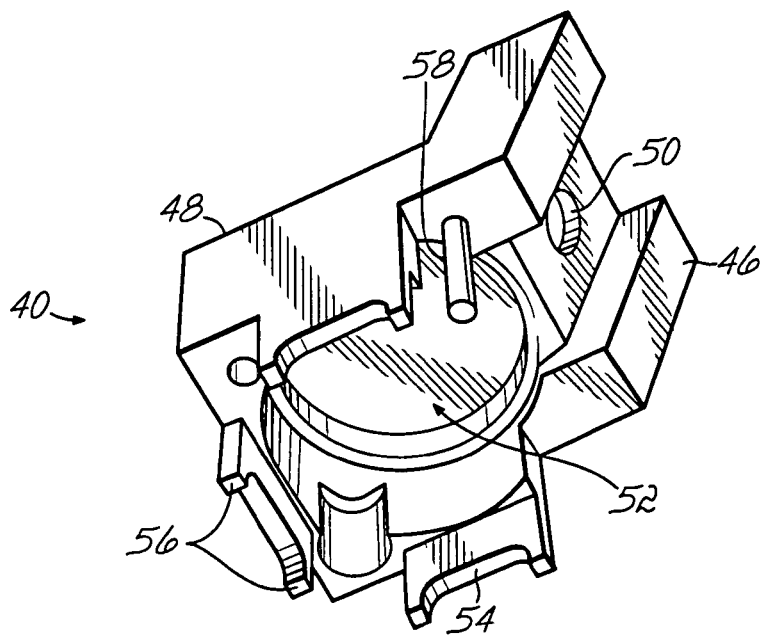
FIG. 2 is a perspective view showing an underside of one component of the locking device of FIGS. 1A–1C.
Figure 3:
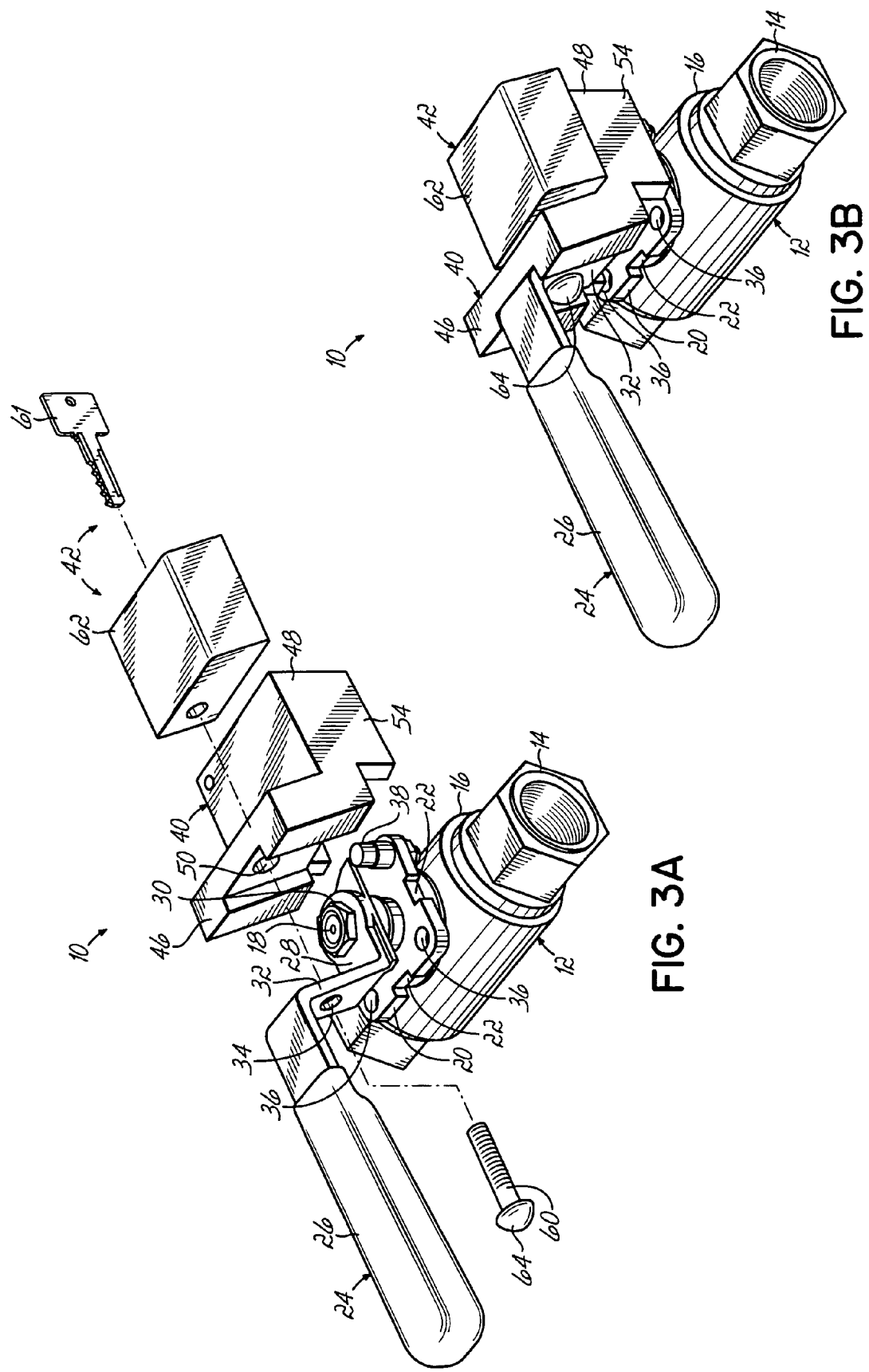
FIGS. 3A–3B are views similar to FIGS. 1B–1C of a second embodiment of a locking device according to this invention.
Figure 4:
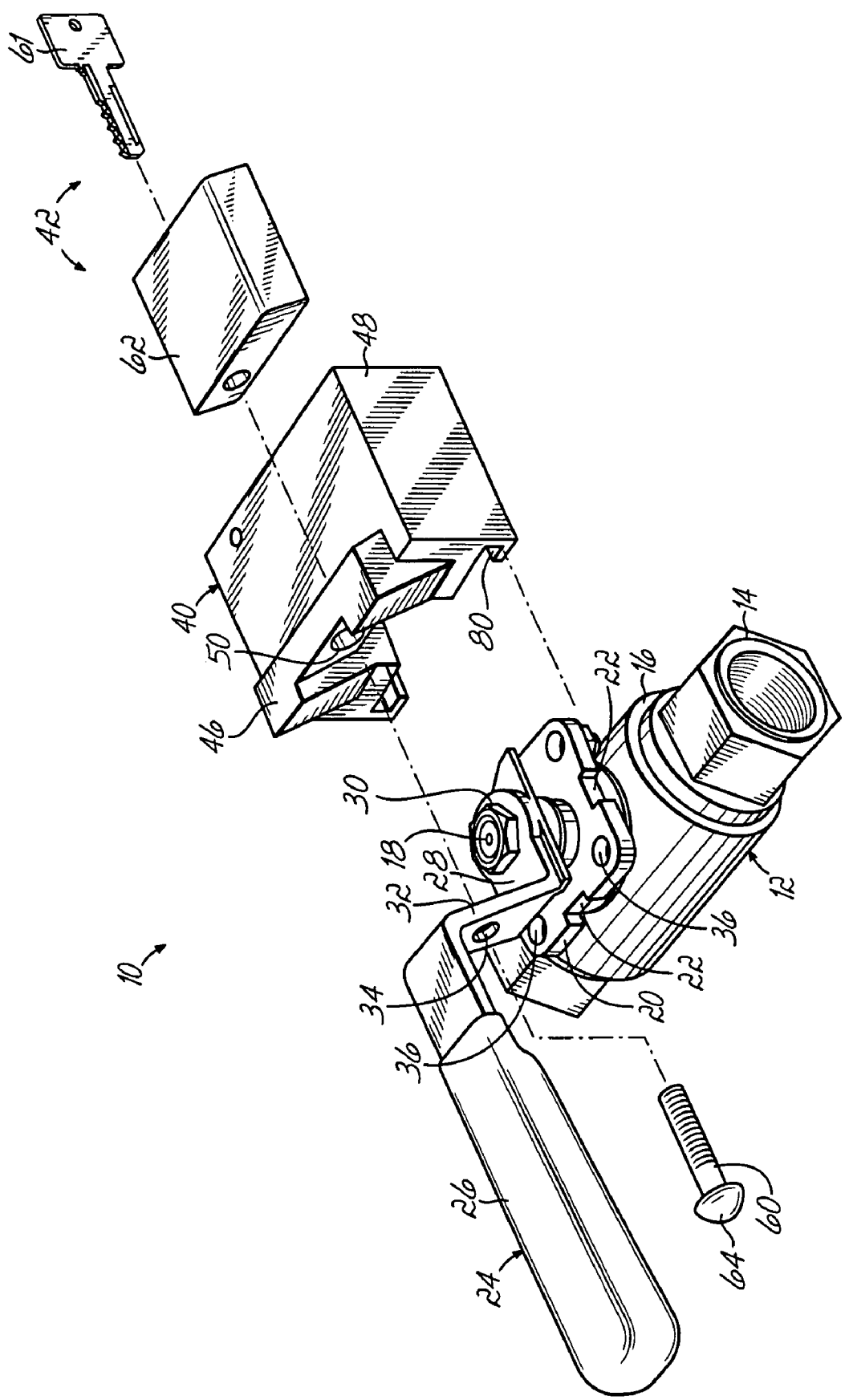
FIG. 4 is a perspective view of a third embodiment of a locking device according to this invention.

Referring now to the FIGS. 1A–4 in which a locking device 10 for a quarter turn valve 12 is shown. Generally, the quarter turn valve 12 includes a number of ports 14 for the entry and exit of fluid through the valve 12. The valve 12 of FIGS. 1A–1C is a multi-port valve having multiple entry or exit ports for fluid flow while the valve 12 of FIGS. 3A–3B and 4 is a two-way valve having a single entry and single exit port. The valve 12 includes a valve body 16 with a rotary valve member (not shown) contained within the valve 12 to block or permit fluid flow into and out of the ports 14 and through the valve 12. The rotary valve member is coupled to a stem 18 projecting upwardly from the valve body 16. The valve body 16 according to the embodiments shown includes a mounting pad 20 positioned atop the valve 12. The stem 18 connected to the rotary valve member projects upwardly through the mounting pad 20. The mounting pad 20, as shown in FIGS. 1A–4 has a generally rectangular or square configuration with a notch 22 generally centered along one or more edges of the mounting pad 20.

A handle 24 is mounted to the stem 18 atop the mounting pad 20 for manipulation of the rotary valve member and opening/closing of the valve 12. Rotation or pivotal movement of the handle 24 through an arc of 90° moves the valve member to/from the open/closed positions. The handle 24 includes a grip portion 26 at a terminal end thereof. The handle 24 also includes a mounting flange 28 which is connected to the stem 18 and secured in place by a nut or other mechanical fastener 30 on the stem 18. The grip 26 and mounting flange 28 are connected to each other by a sloped intermediate portion 32 of the handle 24. The intermediate portion 32 of the handle 24 may have one or more holes 34 there through. The mounting pad 20 may have one or more holes 36 generally positioned adjacent each corner of the mounting pad 20. A stop 38 is mounted through one of the holes 36 in the corner of the mounting pad 20 to limit the rotational movement of the handle 24. While specific embodiments of quarter turn valves are shown and described herein, it should be appreciated by one of ordinary skill in the art that this invention is not limited to any particular design, configuration or embodiment of a valve.

The locking device 10 according to various embodiments of this invention includes a shroud 40 and a lock 42. The shroud 40 is adapted to engage and be seated upon the valve 12 and cover at least a portion of the handle 24 and the stem 18 extending upwardly from the valve body 16. Once securely mounted on the valve 12 (see FIGS. 1C and 3B for example), the shroud 40 inhibits movement of the handle 24 and thereby adjustment of the valve 12 to/from the open/closed positions. In certain embodiments, the shroud 40 is coupled to the valve 12 through a tether 44 so that when the shroud 40 is not mounted upon the valve 12 it will not be lost and can be easily located by the user.

The shroud 40 includes a channel-shaped extension 46 extending upwardly from a main body portion 48 of the shroud 40. The channel-shaped extension 46 is adapted to receive therein and cover at least a portion of the handle 24 and preferably the intermediate portion 32 of the handle 24. The mounting flange 28 of the handle 24 is covered by the main body portion 48 of the shroud 40 along with other components of the valve 12. The channel-shaped extension 46 also includes a hole 50 which is adapted to be aligned with one of the holes 34 in the handle 24 when the shroud 40 is engaged with the valve body 16 as shown.

The shroud 40 also includes a cavity 52 (see FIG. 2) specifically designed and adapted to receive therein the mounting flange 28, nut 30, stem 18 and adjacent portions of the valve 12 and cover those components to inhibit access to them or tampering with their operation by an unauthorized user. Additionally, the shroud 40 of FIGS. 1A–3B includes at least one downwardly depending extension 54 adapted to engage and be seated within one of the notches 22 in the mounting pad 20 to thereby inhibit rotational movement of the shroud 40 and the handle 24 engaged therewith. Each downwardly depending extension 54 may have one or more spaced feet 56 to support the shroud 40 atop the valve body 16. As shown, the shroud 40 may include a downwardly depending spike 58 (FIG. 2) which is inserted through one of the exposed holes 36 in the mounting pad 20 to thereby accurately and securely position the shroud 40 on the valve 12 and further inhibit rotational movement of the handle 24 relative to the valve body 16.

The locking device 10 of FIG. 4 includes a slotted channel 80 formed in a lower portion of the shroud 40. The channel 80 is sized and configured to receive therein the mounting pad 20 of the valve 12. As such, this locking device 10 is installed on the valve 12 in a generally horizontal direction with the mounting pad 20 slidably received in the channel 80.

Once the shroud 40 is installed on the valve 12 as shown, the lock 42 is operable by a key 61 to disengage and release a post 60 from the body 62 of the lock 42. The post 60 is disengaged from the lock body 62 and inserted through the aligned holes 50, 34 in the shroud 40 and handle 24. The post 60 includes a mushroom-shaped knob 64 which is juxtaposed to the channel-shaped extension 46. The post 60 then projects through the holes 50, 34 for locking engagement with the lock body 62 which is juxtaposed to the intermediate portion 32 of the handle 24 as shown. Alternatively, the lock 42 may be a standard padlock (not shown) compatible with the locking device 10 according to one or more embodiments of this invention.

As such, with the locking device 10 of this invention, the post 60 is substantially concealed within the channel-shaped extension 46 and the handle 24 thereby inhibiting or preventing access to the post 60 for unauthorized sawing or dismantling of the lock 42 and removal of the shroud 40 from the valve 12. Similarly, with the locking device 10 of FIG. 4, the mounting pad 20 in addition to at least portions of the stem 18 and handle 24 are securely concealed to prevent unauthorized access. Moreover, removal of the lock 42 and shroud 40 is easily accomplished by an authorized user inserting the key into the lock body 62 and removing the lock body 62 from the post 60 and the shroud 40 and post 60 from the valve 12.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

I claim:

1. A locking assembly for a valve having a valve member rotatable within a valve body between open and closed positions by a handle, the locking assembly comprising:
   a shroud adapted to engage the valve body and cover at least a portion of the handle and to inhibit movement of the handle when engaged with the valve body and handle;
   a hole in the shroud adapted to be aligned with a hole in the handle when the shroud is engaged with the valve body and when the shroud is covering at least a portion of the handle; and
   a lock having a body and a post releasably engaged with the lock body, the post being adapted to be inserted through the aligned shroud hole and handle hole when the shroud is engaged with the valve body and covering at least a portion of the handle the post being substantially concealed within the aligned holes to inhibit access to the post when inserted into the holes, the lock inhibiting removal of the shroud from the valve when installed thereon.

2. The locking assembly of claim 1 further comprising:
   a tether coupling the shroud to the valve.

3. The locking assembly of claim 1 wherein the shroud further comprises a channel shaped extension adapted to receive therein and cover the portion of the handle.

4. The locking assembly of claim 1 further comprising:
   a mushroom-shaped knob on a terminal end of the post.

5. The locking assembly of claim 1 wherein the valve body includes a mounting pad with a stem extending from the valve member projecting there through, the handle being mounted to the stem and the shroud further comprising:
   a downwardly depending extension adopted to engage the mounting pad and thereby inhibit rotational movement of the shroud relative to the valve.

6. The locking assembly of claim 1 wherein the valve body includes a mounting pad with a stem extending from the valve member projecting there through, the handle being mounted to the stem and the shroud further comprising:
   a slotted channel adapted to receive therein a portion of the mounting pad when the lock is mounted on the valve.

7. The locking assembly of claim 1, the valve further comprising a valve stem and wherein the shroud is a unitary member and conceals the valve stem.

8. A combination comprising:
   a valve having a valve member rotatable within a valve body between open and closed positions by a handle, the handle being coupled to a valve stem;
   a shroud adapted to engage the valve body and cover the valve stem and at least a portion of the handle and to inhibit access to the valve stem and movement of the handle when engaged with the valve body, valve stem and handle; a hole in the shroud adapted to be aligned with a hole in the handle when the shroud is engaged with the valve body and when the shroud is covering at least a portion of the handle; and
   a lock having a body and a post releasably engaged with the lock body, the post being adapted to be inserted through the aligned shroud hole and handle hole when the shroud is engaged with the valve body and covering the valve stem and at least a portion of the handle, the lock inhibiting removal of the shroud from the valve when installed thereon.

9. The combination of claim 8 further comprising:
   a tether coupling the shroud to the valve.

10. The combination of claim 8 wherein the shroud further comprises a channel shaped extension adapted to receive therein and cover the portion of the handle.

11. The combination of claim 8 further comprising:
    a mushroom-shaped knob on a terminal end of the post.

12. The combination of claim 8 further comprising:
    a mounting pad on the valve body;
    the valve stem extending from the valve member projecting through the mounting pad and the handle being mounted to the valve stem;
    an extension depending downwardly from the shroud and adapted to engage the mounting pad and thereby inhibit rotational movement of the shroud relative to the valve.

13. The combination of claim 8 further comprising:
    a mounting pad with valve stem extending from the valve member projecting there through, the handle being mounted to the valve stem; and
    a slotted channel in the shroud adapted to receive therein a portion of the mounting pad when the lock is mounted on the valve.

14. The combination of claim 8 wherein the valve is a quarter turn valve.

15. The combination of claim 8 wherein the shroud is a unitary member and conceals the valve stem.

16. A locking assembly for a quarter turn valve having a valve member rotatable within a valve body between open and closed positions by a handle, the valve body including a mounting pad with a stem extending from the valve member projecting there through and the handle is mounted to the stem, the locking assembly comprising:
    a shroud adapted to engage the valve body and cover at least a portion of the handle and to inhibit movement of the handle when engaged with the valve body and handle;
    a channel shaped extension projecting from the shroud and adapted to receive therein and cover at least a portion of the handle;
    a hole in the shroud adapted to be aligned with the hole in the handle when the shroud is engaged with the valve body and when the shroud is covering the portion of the handle;
    an extension depending downwardly from the shroud and adapted to engage the mounting pad and thereby inhibit rotational movement of the shroud relative to the valve; and a lock having a body and a post releasably engaged with the lock body, the post being adapted to be inserted through the aligned shroud hole and handle hole when the shroud is engaged with the valve body and covering at least a portion of the handle, the lock inhibiting removal of the shroud from the valve when installed thereon;

wherein the post is substantially concealed with the aligned holes to inhibit access to the post when inserted into the holes.

17. The locking assembly of claim 16 further comprising:
a tether coupling the shroud to the valve.

18. The locking assembly of claim 16 further comprising:
a mushroom-shaped knob on a terminal end of the post.

19. The locking assembly of claim 16 further comprising:
a slotted channel in the shroud and adapted to receive therein a portion of the mounting pad when the lock is mounted on the valve.

20. The locking assembly of claim 16, the valve further comprising a valve stem and wherein the shroud is a unitary member and conceals the valve stem.

* * * * *